Nov. 21, 1967  W. SUYDAM  3,353,804
APERTURED WALLS FOR INDUSTRIAL FURNACES
Filed June 24, 1965  3 Sheets-Sheet 1
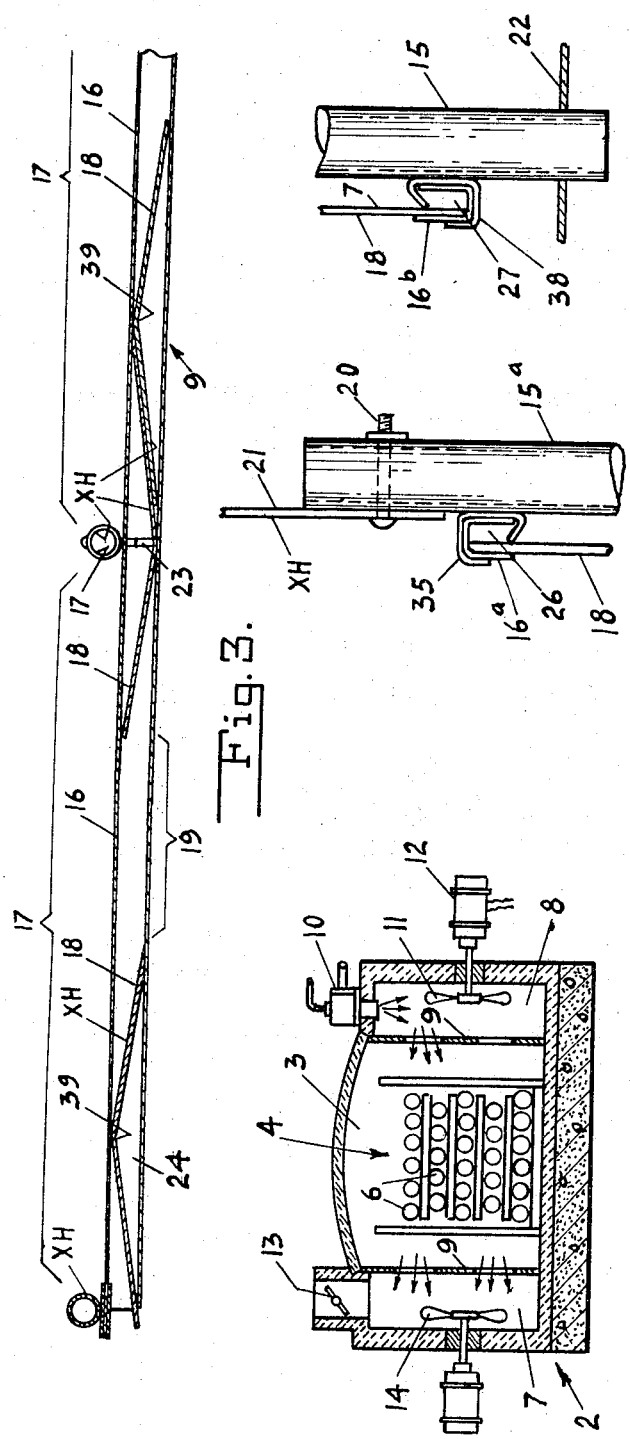
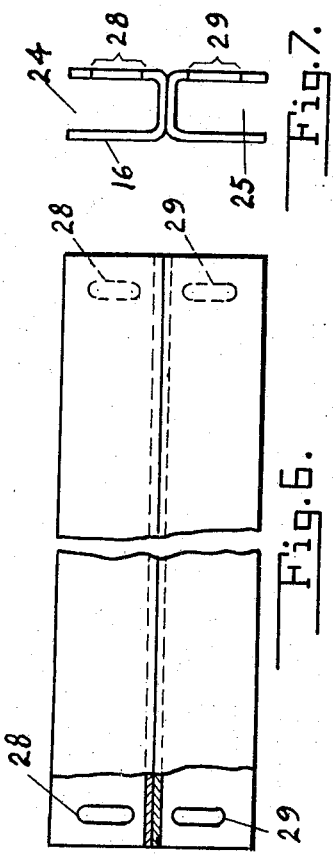
INVENTOR.
WALTER SUYDAM.
BY Christy, Parmelee and Strickland
ATTORNEYS.

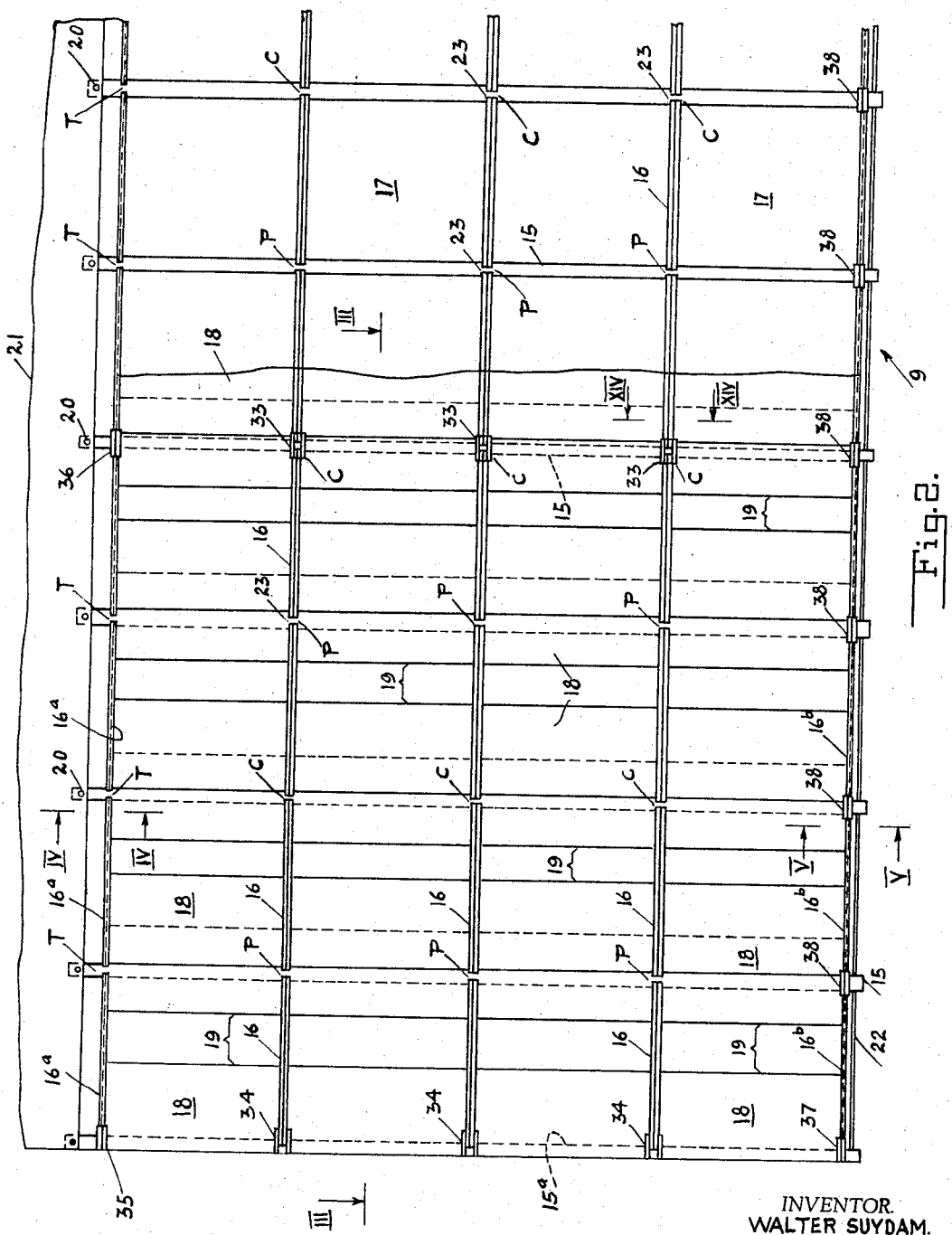

INVENTOR
WALTER SUYDAM.

BY

ATTORNEYS.

United States Patent Office
3,353,804
Patented Nov. 21, 1967

3,353,804
APERTURED WALLS FOR INDUSTRIAL FURNACES
Walter Suydam, Mount Lebanon Township, Allegheny County, Pa., assignor to Loftus Engineering Corporation, Pittsburgh, Pa., a corporation of Maryland
Filed June 24, 1965, Ser. No. 466,772
8 Claims. (Cl. 263—40)

ABSTRACT OF THE DISCLOSURE

The disclosure herein relates to Industrial Furnaces in which hot gases are propelled by a fan or blower over the work in the furnace chamber. An apertured wall is arranged in the line of flow of gases, and such wall includes improved means for varying over its effective area the relative sizes of the wall apertures to obtain the desired distribution of the flowing gases over the body of the work.

My invention relates to improvements in industrial furnaces, in which work-loads are heated.

For present purposes the invention will be described as it may be applied in annealing a work-load of aluminum logs, understanding that those skilled in the art will readily perceive the many other and various applications in which the invention will find utility.

In such a work-load the aluminum logs are suitably supported in the work-chamber of the furnace. The furnace structure includes a plenum, in which the required furnace heat may be generated by the burning of fuel. Between the plenum and the work-chamber extends an apertured wall portion, whereby the hot products of combustion may be impelled from the plenum into the furnace chamber and through the work-load. In their flow the hot combustion products heat the aluminum logs to desired temperature. Upon passing through the work-load the gases may be passed into a chimney, or they may be vented directly into the outer atmosphere.

By suitably spacing and sizing the apertures in the wall portion between the plenum and the work-chamber of the furnace, the flow of hot gases from the plenum into furnace chamber may be so distributed as to provide uniform heating of the logs throughout the body of the work-load.

The object of the invention is to provide an apertured wall structure which is particularly effective in obtaining uniformly distributed heating of a work-load in a furnace.

Another object of the invention is to provide an improved apertured wall portion in which sizes of the apertures may be readily varied in such manner as to obtain the desired distribution of the flow of hot furnace gases.

Other objects of the invention will be discerned in the ensuing specification.

An exemplary embodiment of the invention is illustrated in the accompanying drawings, in which:

FIG. 1 is a diagrammatic view in vertical, transverse section of an industrial furnace in which a structure of the invention finds utility;

FIG. 2 is a fragmentary view, showing in side elevation an apertured wall portion of the furnace;

FIG. 3 is a fragmentary sectional view of the apertured wall portion, as seen on the plane III—III of FIG. 2;

FIG. 4 is a fragmentary sectional view, as seen on the plane IV—IV of FIG. 2, showing a detail of structure on larger scale;

FIG. 5 is a similar view, showing a structural detail on the plane V—V of FIG. 2;

FIG. 6 is a fragmentary view, showing on larger scale and partly in side elevation and partly in vertical section one of the elements or sections that form the horizontal frame members of the apertured wall portion;

FIG. 7 is a view in end elevation of the frame member shown in FIG. 6;

Figure 8:
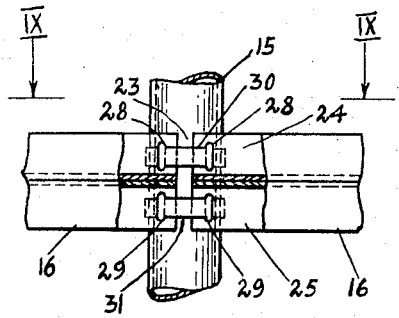
FIG. 8 is a fragmentary view on the scale of FIGS. 4 and 5 illustrating the means for securing certain of the horizontal frame members to vertical frame members, portions of the horizontal frame members being broken away better to reveal parts of the assembly.

Referring to FIG. 1 of the drawings a furnace 2 is schematically illustrated in transverse section. The work-chamber 3 of the furnace contains a work-load 4 of aluminum logs 5 piled with spacer bars 6. In this case the furnace is provided with two plenums 7 and 8 that extend the length of the work-chamber 3, and between each plenum and the work-chamber is an apertured wall portion 9. One or more burners 10 fire into plenum 8, and one or more impellers 11, each driven by an electric motor 12, force the hot products of combustion through the adjoining apetured wall portion 9 and through the work-load 4 in the chamber 3 of the furnace. Upon passing through the work-load, and yielding heat to the aluminum logs 5 to be annealed or homogenized, the products of combustion exit through the apertured wall portion 9 of plenum 7, whence such products of combustion pass to the outer atmosphere by way of a dampered stub-stack 13. One or more motor-driven impellers 14 are provided in plenum 7 to assist the impellers 11 in promoting the desired flow of the products of combustion.

In certain cases burners 10 will be provided to fire into either plenum 7 or plenum 8, and each plenum may be equipped with stub-stacks. With this arrangement plenum 8 may be fired and the products of combustion passed through the work-load and caused to exit through plenum 7. Periodically, the plenum 7 may be fired and the hot products of combustion passed through the work-load in opposite direction and exited through plenum 8, whose burners 10 at the time are turned off. This periodic reversal of flow of the hot products of combustion through the work-load is effective to give a more uniform heating of the aluminum logs that comprise the work-load.

It will be manifest that air, or other gas, may be heated and passed through the work-load to be heated. For example, the plenums 7 and 8 may be alternately "fired" by means of electrical resistor heating elements (not shown, but well known in the art), and the impellers 11 and 14 may cause air to stream over the heating elements to become heated. The heated air may be propelled through the work-load (after the manner described for the hot products of combustion) and caused to heat the aluminum logs.

The present invention is centered in the structure of the apertured wall portions 9. Each wall portion 9 comprises two sets of elongate frame members such as the horizontally spaced vertical frame members 15 and the vertically spaced horizontal frame members 16 (FIG. 2). The spaced frame members of the two sets are united to each other in crossing relation, at angles of ninety degrees, to provide over the expanse of the wall portion rectangular apertures 17 (FIGS. 2 and 3). In these apertures panels 18 of heat-resisting steel are mounted for adjustment in horizontal direction, whereby the effective sizes of the apertures are determined by openings 19 between the panels. The panels 18 may be horizontally adjusted in their otherwise fixed positions, whereby the widths or sizes of the openings 19 may be individually regulated. By so regulating the size of the individual openings 19 over the expanse of each wall portion 9, the desired distribution of the hot gases flowing from a plenum into the furnace work-chamber may be obtained. Similarly, the outflow of gases from the furnace work-chamber into the opposite plenum may be distributed over the area of the corresponding wall portion 9. This distributed flow of gases into and out of the furnace work-chamber renders possible the greatest uniformity in heating the work-load throughout its body of spaced aluminum logs.

Turning to a more specific consideration of the construction of the apertured wall portion, the vertical frame members 15 are formed of steel pipes, each of which is secured at its upper end by a steel pin 20 to a rigid supporting member 21 of the furnace structure, as shown in FIGS. 2 and 4. Each vertical frame member 15 at its lower end extends through an orifice in a bottom support 22 of the furnace structure, as shown in FIGS. 2 and 5. The engagement of the lower ends of frame members 15 in such orifices is a sliding engagement, whereby there is freedom for the lengthwise expansion and contraction of members 15 under the effect of variations in furnace temperature.

The horizontal frame members 16 are made in sections that extend between the vertical frame members 15, with spaces 23 (FIGS. 2, 3, 8, 9 and 15) between the sections to provide clearance for expansion and contraction of such frame members. With the exception of the top and bottom frame members 16a and 16b, respectively, the frame members 16 are of the double channel shape as shown in FIGS. 3, 6, 7, 8, 9, 14 and 15, providing upwardly and downwardly open grooves 24 and 25, respectively, arranged slideably to engage the bottom and top edges of panels 18. The sections of the top frame member 16a are of single channel shape, each with its groove 26 opening downwardly to engage the upper edges of the top row of panels 18, as shown in FIG. 4. The sections of the bottom frame member 16b are of single channel shape, each with its groove 27 opening upwardly to engage the lower edges of the bottom row of panels 18, as shown in FIG. 5.

Figure 9:
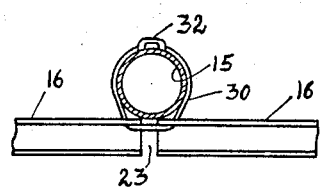
FIG. 9 is a view of the assembled structure, as seen on the plane IX—IX of FIG. 8.
Figure 12:
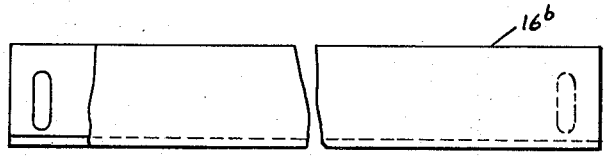
FIG. 12 is a fragmentary view of certain of the horizontal frame members used at the top and bottom of the apertured wall structure.
Figure 13:
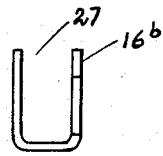
FIG. 13 is a view in elevation of the latter frame member, as seen from the right of FIG. 12.

FIGS. 8 and 9 illustrate the means for securing the adjacent spaced ends of certain of the horizontal frame sections 16 to certain of the vertical frame members 15, as will presently appear. The frame sections 16 are provided with a pair of slots 28 and 29 adjacent each of their opposite ends, cf. FIG. 6. A steel strap 30 is threaded through the slots 28, 28 in the adjacent ends of two sections 16, and passed around the body of vertical frame member 15. The strap is tightened and its ends clinched and securely fastened by a fastener 32, FIG. 9. Likewise, a steel strap 31 is passed through slots 29, 29 and fitted around frame member 15 and locked. These two straps firmly engaged and secure the adjacent ends of two horizontal frame sections 16, 16 to a vertical frame member 15. A tool well-known in the steel banding art is available on the open market for tightening and locking the straps 30 and 31 in place, wherefore it is needless to involve this specification further with such tool.

Figure 14:
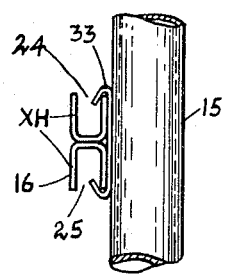
FIG. 14 is a fragmentary view, showing partly in vertical section and partly in elevation the means for securing the ends of two horizontal frame members to a vertical frame member, as seen on the plane XIV—XIV of FIG. 15.
Figure 15:
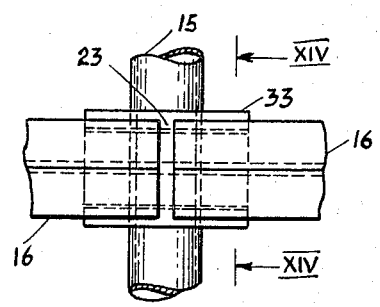
FIG. 15 is a view of the latter means, as seen from the left of FIG. 14.

Referring to FIG. 2, the companion ends of the frame sections 16 are rigidly united by steel bands 30, 31 to alternate vertical frame members 15 at the point P, and the otherwise free ends of such frame members are slideably engaged in clips 33 of stainless steel welded to the appropriate vertical frame member 15, as shown in FIGS. 14 and 15. Such clips 33 are provided at the points C in FIG. 2. Each of the outermost or end vertical frame members, one only of which appears at 15a in FIG. 2, has clips 34 similar in structure to clips 33 welded to it, slideably to engage the outer ends of the corresponding horizontal frame sections 16. Thus, the frame sections while being securely integrated in the frame structure of each wall portion 9, are free to expand and contact under varying furnace temperatures, without any danger of warpage or buckling of the wall-portion structure.

Figure 11:
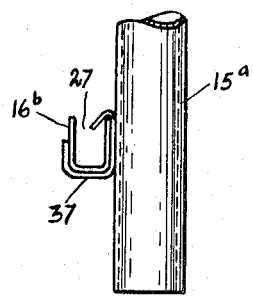
FIG. 11 is a view in elevation of the latter structure, as seen from the left of FIG. 10.
Figure 10:
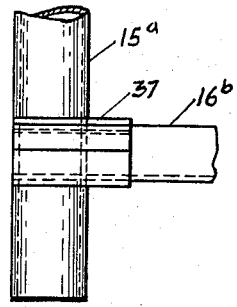
FIG. 10 is a fragmentary view, showing in side elevation the structure for securing horizontal frame members to the vertical frame members outermost in the assembled apertured wall.

The top frame sections 16a are engaged to the vertical frame member 15a at each end of the wall portion 9 by a stainless steel clip 35 welded in place as shown in FIG. 4, while the ends of all other top horizontal frame sections 16a are slideably engaged similarly by clips 36 at the points T, FIG. 2. The bottom horizontal frame sections 16b are engaged to each of the outermost vertical frame members 15a by a clip 37 welded in place (cf. FIGS. 2, 10 and 11), and the companion ends of the intermediate bottom frame sections 16b are slideably engaged by clips 38, as shown in FIGS. 2 and 5. The entire structure of wall portion 9 is free to expand and contract to the degree required to prevent warping under furnace temperature.

The bodies of panels 18 of heat-resisting steel may be flat, engaged at their lower edges in the upwardly open grooves 24 and 27 of the horizontal frame sections 16 and 16b, while the top edges of the panels 18 are engaged in the downwardly open grooves 25 and 26 of the frame sections 16 and 16a. The panels 18 may be slid relatively to one another along the grooves that engage their top and bottom edges, whereby size of the apertures or openings 19 between the panels may be varied in such way as to provide the desired distribution of flow through the wall portions 9, as described earlier in this specification.

In refinement the body of each panel 18 may be creased on a vertical medial line 39, as shown in FIG. 3. The angular shape thus imparted to the panels insures a snug yet sliding engagement of the panels with the grooves in frame sections 16, 16a and 16b. Unintentional movement of the panels is thus avoided. The angular shape of the panels 18 permits the left-hand end of the panel furthest to the right in FIG. 3 to overlap the right-hand half or the next-adjacent panel. It will be noted that the grooves 24 and 25 are wider than the edges of the panels 18 engaged in the grooves; cf. groove 24 and panel 18 at the left-hand end of FIG. 3. Such overlapping of the horizontally slideable panels is an important feature, allowing maximum regulation of the wall apertures 17.

Various modifications of the structure illustrated and described herein will occur to the artisan or engineer, without departing from the essence of the invention defined in the following claims.

I claim:

1. In a furnace having a work-chamber in which to heat a work-load, a plenum, an apertured wall portion through which gas may flow from said plenum into said work-chamber, and means for impelling such flow of gas; the invention herein described wherein said wall portion comprises a frame structure including a set of elongate horizontally-spaced vertical frame members and a set of elongate vertically-spaced horizontal frame members, means for securing the spaced frame members of the two sets to one another in crossing relation to provide a multiplicity of rectangular openings in the frame structure, said horizontal frame members including upwardly and downwardly open grooves, a plurality of substantially rectangular heat-resisting panels having bottom and top edges respectively engaged in said upwardly and downwardly open grooves, the engaged panels being slideable in said grooves into overlapping relation with respect to one another for selectively adjusting the effective sizes of said openings, whereby to obtain over the area of said wall portion a selective distribution of the flow of gas from said plenum into said furnace chamber.

2. An apertured wall portion for industrial furnaces, said wall portion comprising a frame structure formed of a set of elongate horizontally-spaced vertical frame members and a set of vertically spaced horizontal frame members, the spaced frame members of the two sets being secured to one another in crossing relation to provide a multiplicity of rectangular openings in the frame structure, the horizontal frame members including upwardly and downwardly open grooves extending longitudinally thereof, and substantially rectangular vertical panels mounted in the frame structure with their upper and lower edges slideably engaged in said downwardly and upwardly open grooves respectively, the width of said grooves being greater than the thickness of the engaged edges of said panels whereby adjacent panels of the assembly may be adjusted in overlapping relation in said grooves to vary the effective sizes of said openings in said wall portion.

3. The structure of claim 2, wherein the bodies of the panels are angularly shaped as viewed in horizontal section to facilitate the said overlapping of substantial portions of the bodies of adjacent panels.

4. The structure of claim 2, together with fixed means for supporting each of said vertical frame members at one end, and means for yieldingly engaging each of such frame members at opposite end.

5. The structure of claim 2, each of said elongate horizontal frame members comprising a series of sections arranged sequentially end to end with a clearance between the adjacent ends of successive sections to make accommodation for changes in the lengths of the sections due to variations in furnace temperature.

6. The structure of claim 2, each of said elongate horizontal frame members comprising a series of sections arranged sequentially end to end, with a clearance between the adjacent ends of successive sections to make accommodation for changes in the lengths of the sections due to variations in furnace temperature, and slip-fastener means for attaching the ends of said sections to the respective vertical frame members.

7. The structure of claim 2, together with fixed means for supporting each of said vertical frame members at one end, and means for yieldingly engaging each of such frame members at opposite end, each of said elongate horizontal frame members comprising a series of sections arranged sequentially end to end, with a clearance between the adjacent ends of successive sections to make accommodation for changes in the lengths of the sections due to variations in furnace temperature.

8. The structure of claim 2, together with fixed means for supporting each of said vertical frame members at one end, and means for yieldingly engaging each of such frame members at opposite end, each of said elongate horizontal frame members comprising a series of sections arranged sequentially end to end, with a clearance between the adjacent ends of successive sections to make accommodation for changes in the lengths of the sections due to variations in furnace temperature, and slip-fastener means for attaching the ends of said sections to the respective vertical frame members.

References Cited

UNITED STATES PATENTS

| 1,289,890 | 12/1918 | Owens | 263—28 X |
| 1,769,924 | 7/1930 | Jacobus | 110—1 |
| 3,159,944 | 7/1957 | Deming | 110—1 |

FOREIGN PATENTS 588,725  11/1933  Germany.

FREDERICK L. MATTESON, JR., *Primary Examiner.*

JOHN J. CAMBY, *Examiner.*